United States Patent [19]
Davis et al.

[11] Patent Number: 5,898,122
[45] Date of Patent: *Apr. 27, 1999

[54] SQUIB IGNITOR CIRCUIT AND METHOD THEREOF

[75] Inventors: Benjamin R. Davis, Chandler, Ariz.; Kim R. Gauen, Noblesville, Ind.

[73] Assignee: Motorola, Inc., Schaumburg, Ill.

[*] Notice: This patent issued on a continued prosecution application filed under 37 CFR 1.53(d), and is subject to the twenty year patent term provisions of 35 U.S.C. 154(a)(2).

[21] Appl. No.: 08/674,380

[22] Filed: Jul. 2, 1996

[51] Int. Cl.$^6$ .................................................. F42C 11/00
[52] U.S. Cl. ...................... 102/206; 102/215; 102/202.5; 280/735
[58] Field of Search ................ 102/202.5, 206, 102/215, 217, 218; 280/735

[56] References Cited

U.S. PATENT DOCUMENTS

| | | | |
|---|---|---|---|
| 3,736,837 | 6/1973 | Kaprelian et al. | 102/218 |
| 4,015,928 | 4/1977 | Carlson | 431/74 |
| 4,700,263 | 10/1987 | Marshall et al. | 361/251 |
| 4,839,772 | 6/1989 | Choi et al. | 361/256 |
| 4,870,902 | 10/1989 | Simon et al. | 102/201 |
| 5,053,913 | 10/1991 | Lozito et al. | 361/257 |
| 5,347,422 | 9/1994 | Smith et al. | 361/253 |
| 5,411,289 | 5/1995 | Smith et al. | 280/735 |
| 5,460,407 | 10/1995 | Stuckle | 102/201 |

FOREIGN PATENT DOCUMENTS

| | | | |
|---|---|---|---|
| 1717929 | 3/1992 | U.S.S.R. | 102/218 |
| 1520036 | 8/1978 | United Kingdom | 102/215 |
| 2096415 | 10/1982 | United Kingdom | 102/206 |

*Primary Examiner*—Charles T. Jordan
*Assistant Examiner*—Christopher K. Montgomery
*Attorney, Agent, or Firm*—Sharon K. Coleman

[57] ABSTRACT

A squib ignitor circuit (20,40) reduces the probability of an accidental airbag deployment to greatly increase the safety of an automobile. A squib (24,28,44) operates at a voltage significantly higher than the squib ignitor circuit (20,40) to produce heat sufficient to ignite pyrotechnic material. Thus, a short condition to the squib (24,28,44) does not produce an inadvertent airbag deployment. The squib ignitor circuit (20,40) forms a conductive path through an inductor (23,43) via a first transistor (21,41) and a second transistor (22,42). The inductor (23,43) stores energy. The inductor (23,43) produces a voltage substantially greater than the voltage powering the squib ignitor circuit (20,40) when the conductive path is broken. The inductor (23,43) releases the stored energy to the squib (24,28,44) generating heat. A sequence (more than one time) of storing energy and releasing energy by the inductor (23,43) is required to generate heat sufficient to ignite pyrotechnic material by the squib (24,28,44).

17 Claims, 1 Drawing Sheet

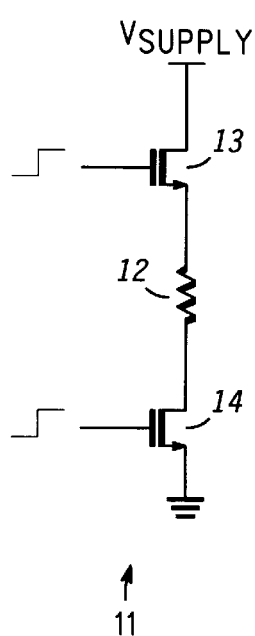
FIG. 1
-PRIOR ART-
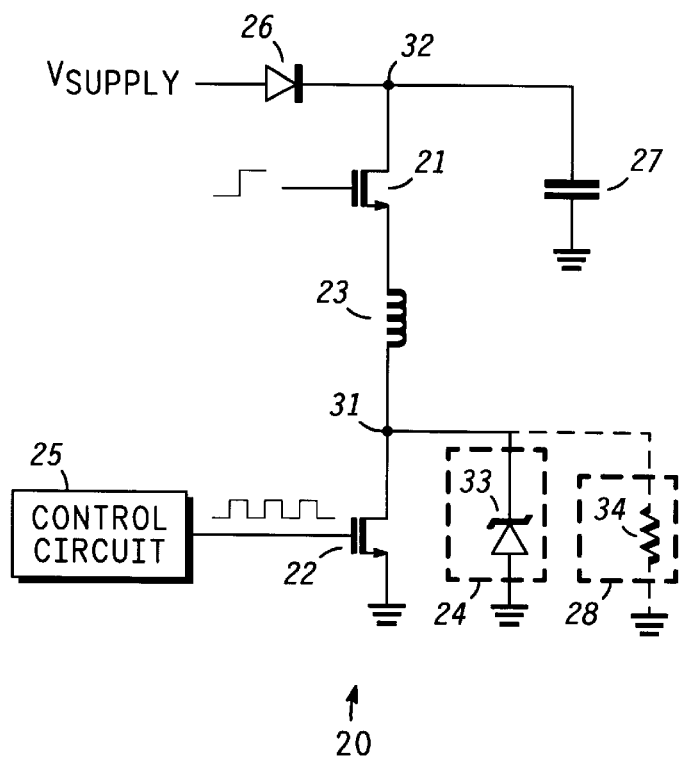
FIG. 2
FIG. 3
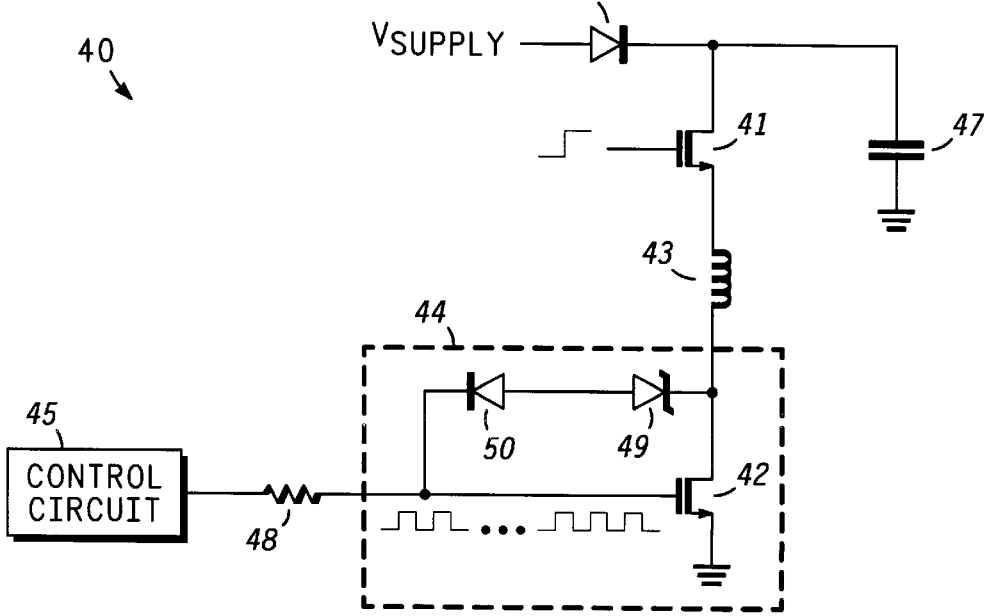

SQUIB IGNITOR CIRCUIT AND METHOD THEREOF

BACKGROUND OF THE INVENTION

This invention relates, in general, to airbag systems, and more particularly, to squib ignitor circuits for airbag systems.

Besides the physical structure of an automobile, airbags and seat belts are the primary safety mechanisms in preventing injuries to an occupant in the event of an automobile accident. An airbag is a safety device that is deployed to cushion an occupant from an impact. Sensors in an automobile detect rapid deceleration or an impact via proximity sensors. Once an accident situation is detected, the airbags of a vehicle are deployed to prevent the occupants from hitting a hard surface within the automobile thereby preventing serious injury.

In general, airbags are placed in locations or surfaces of an automobile that previously caused occupant injuries. For example, head impact is prevented by placing airbags in the steering wheel or dash board of an automobile. Airbags are also placed in doors for occupant protection in side impacts and under the dash to prevent leg injuries.

The duration of a crash typically can be measured in milliseconds. The accident must be sensed and the airbag deployed within a few milliseconds after impact. Circuitry couples energy to a squib which is in contact with ignitor pyrotechnic material. The ignitor pyrotechnic material resides near the airbag inflator pyrotechnic material. Upon sensing an accident condition, energy is coupled to the squib which produces heat sufficient to ignite the ignitor pyrotechnic material. The hot gases produced by the ignition of ignitor pyrotechnic material ignites the airbag inflator pyrotechnic material. The burning inflator pyrotechnic material produces hot gases which expand into the airbag to inflate the airbag. The inflated bag cushions a person being propelled into the airbag during a collision.

A problem with airbags is the force at which an air bag is propelled from its enclosure when deployed. A person can be seriously injured by the impact of an inflating airbag. Airbag circuits have been designed to prevent inadvertent airbag deployment. Still, a wire of the airbag system shorted to a power source of an automobile can accidentally deploy an airbag. Rescue workers have needlessly been hurt trying to cut victims of an accident from an automobile when an airbag was deployed during the rescue attempt.

It would be of great benefit if a squib ignitor circuit could be provided that significantly reduces inadvertent deployment of an airbag.

BRIEF DESCRIPTION OF THE DRAWINGS

FIG. 1 is a schematic diagram of prior art circuitry to provide energy to a squib;

FIG. 2 is a schematic diagram of a squib ignitor circuit in accordance with the present invention; and FIG. 3 is a schematic diagram of a squib ignitor circuit in accordance with the present invention.

DETAILED DESCRIPTION OF THE DRAWINGS

FIG. 1 is a is a schematic diagram of prior art circuitry to provide energy to a squib 12. An airbag is inflated by detonating or igniting a charge of pyrotechnic material in an airbag inflator. Inflator pyrotechnic material is ignited by a squib ignitor circuit 11 having squib 12 in contract with a small charge of pyrotechnic material. Squib 12 is typically a wire or some other resistive material capable of generating heat when conducting a current.

Squib ignitor circuit 11 comprises squib 12, a transistor 13, and a transistor 14. In theory, a single transistor or switch could be used to couple energy to squib 12. The use of a single switch greatly increases the risk of inadvertent detonation by inadvertently enabling the single switch or shorting the squib to a power source. In the embodiment shown in FIG. 1, two transistors or switches are enabled to form a complete circuit path for coupling energy to squib 12. The use of two switches provides a degree of fail-safing against inadvertent enabling of an airbag. More than a single event (or short condition) has to occur before inadvertent detonation occurs in a two transistor squib ignitor circuit. For example, if one transistor was accidentally enabled a complete circuit path would not be formed. Another event such as the squib being shorted to a power source or the remaining transistor being enabled would have to occur for inadvertent deployment to occur. Furthermore, the use of two switches allows independent operational tests to be conducted on switches without causing detonation.

Transistor 13 is commonly referred to as a High Side Switch (HSS) as it is coupled to a power supply terminal Vsupply. Conversely, transistor 14 is commonly referred to as a Low Side Switch (LSS) as it is coupled to a power supply terminal that is grounded. In general, transistors 13 and 14 are centrally located within an automobile. Long wire lengths are required to connect transistors to a corresponding squib. The wires are susceptible to electromagnetic pickup. A problem faced by automobile manufacturers is inadvertent airbag deployment due to electromagnetic pickup. The problem is solved by providing a voltage Vsupply that is substantially greater than a battery voltage (12 volts) of an automobile. The higher voltage stores energy more efficiently for a squib ignitor circuit application. The higher voltage, for example 40 volts, needed to drive squib 12 to ignite pyrotechnic material corresponds to an increase in current (typically greater than one ampere) which is significantly beyond any current that can be electromagnetically induced in the connecting wires under normal operation of the automobile. Still, inadvertent deployment can occur via a short to battery (12 volts) or ground, since this is sufficient voltage to heat commonly used squibs.

Although the two switch methodology employed by automobile manufacturers for coupling energy to a squib has been effective, it is not perfect. People have been injured by inadvertent airbag deployment. As mentioned previously, rescue workers have been killed through inadvertent airbag deployment when trying to remove injured people from a vehicle. Sections of a vehicle sometimes must be cut or removed to get to an injured person. During the cutting process it is possible to short a squib to a power source such that a non-deployed airbag is deployed. Another mechanism that has inadvertently deployed an airbag is vehicle flooding. A serious injury could occur if someone is near the airbag when it is deployed.

FIG. 2 is a schematic diagram of a squib ignitor circuit 20 in accordance with the present invention. Squib ignitor circuit 20 will not deploy an airbag when a short occurs. In fact, squib ignitor circuit 20 is designed such that the DC voltages commonly used in an automobile when coupled to the squib will not produce sufficient heat to ignite pyrotechnic material.

Squib ignitor circuit 20 comprises a transistor 21, a transistor 22, an inductor 23, a squib 24, a control circuit 25, a diode 26, and a capacitor 27. In an embodiment of squib ignitor circuit 20, the circuitry shown in FIG. 2 is located with the airbag. Power is wired from a power source of the automobile through diode 26. Diode 26 has an anode connected to a first power supply terminal for receiving a power supply voltage Vsupply and a cathode connected to a node 32. Capacitor 27 has a first terminal connected to node 32 and a second terminal connected to a second power supply terminal for receiving a second power supply voltage (e.g. ground).

Diode 26 isolates the power source from squib ignitor circuit 20. Capacitor 27 stores sufficient charge to power squib ignitor circuit 20 in the event that the power source (Vsupply) is cut off in an accident situation. Directly storing power local to squib ignitor circuit 20 and the corresponding airbag mechanism has several benefits. First, placing squib ignitor circuit 20 locally with an airbag minimizes wire length between squib 24 and the drive circuitry. Thus, electromagnetic pickup problems that could inadvertently deploy the airbag are substantially reduced. Second, a squib can be made to reduce its firing requirements and the power supply voltage Vsupply can be reduced corresponding to the reduction in electromagnetic pickup. Third, the capacitance value of capacitor 27 is reduced since it powers only squib ignitor circuit 20 and the firing currents are lower.

Transistors 21 and 22 couple inductor 23 to the first and second power supply terminals. Transistors 21 and 22 have a drain, a gate, and a source respectively corresponding to a first electrode, a control electrode, and a second electrode. In an embodiment of squib ignitor circuit 20, transistors 21 and 22 are Insulated Gate Field Effect Transistors (IGFETs) although other transistor types such as bipolar transistors or Insulated Gate Bipolar Transistors (IGBTs) could be used. Transistor 21 has a drain connected to node 32, a gate coupled for receiving a control signal, and a source. Inductor 23 has a first terminal connected to the source of transistor 21 and a second terminal connected to a node 31. Transistor 22 has a drain connected to node 31, a gate, and a source connected to ground.

Control circuit 25 provides a series of pulses for enabling and disabling transistor 22. Control circuit 25 has an output connected to the gate of transistor 22. Squib 24 is placed in contact with pyrotechnic material. Squib 24 has a first terminal connected to node 31 and a second terminal connected to ground. Squib 24 comprises a zener diode 33 having an anode connected to ground and a cathode connected to node 31.

The technique used to provide energy to a squib substantially decreases the risk of inadvertent airbag deployment. Heat is generated by pulsing energy to squib 24. Prior art squib ignitor circuits relied on a DC current provided to a squib (typically a resistor) to generate heat. As mentioned previously, a two transistor configuration requires both transistors to somehow be enabled or one transistor enabled and the squib shorted to a power supply voltage to inadvertently connect power to the squib. In squib ignitor circuit 20 the power supply voltage Vsupply is reduced to a level (for example 12 volts) that will not generate sufficient heat in squib 24 to ignite pyrotechnic material. Thus, direct shorts which couple a DC voltage across squib 24 are no longer a problem. Also, a short condition that enables both transistors 21 and 22 does not in itself provide energy to squib 24. The only effect this will have is a power drain in coupling a DC current through inductor 23.

By pulsing the energy to a squib, another constraint is added that is almost impossible to duplicate. The following situation would have to occur in order to inadvertently cause squib 24 to produce heat sufficient to ignite pyrotechnic material. First, transistor 21 would have to be inadvertently enabled or the first terminal of inductor 23 shorted to Vsupply. Second, transistor 22 would have to be intermittently enabled and disabled or the second terminal of inductor 23 intermittently connected and disconnected to ground. Third, the time period or duration of node 31 being connected to ground for each pulse would have to be long enough to store energy in inductor 23. Fourth, the frequency at which node 31 is intermittently connected to ground must be fast enough to insure an increase the heat dissipated by squib 24. For example, if the pulses are spread too far apart the heat generated by squib 24 would dissipate before more energy is provided thereby not increasing the heat of squib 24 with each intermittent connection and disconnection. Finally, if the frequency was correct a minimum number of pulses (enabling and disabling of transistor 22) would have to occur to heat squib 24 to a temperature that ignites pyrotechnic material.

Operation of squib ignitor circuit 20 is described hereinafter. Power to squib ignitor circuit 20 is either provided by Vsupply or capacitor 27. The control signal applied to the gate of transistor 21 enables transistor 21 for coupling the power supply voltage Vsupply to inductor 23. Control circuit 25 applies a series of pulses to the gate of transistor 22 which enables and disables transistor 22. In a first phase of each pulse provided by control circuit 25, transistors 21 and 22 are enabled. Inductor 23 is coupled between Vsupply and ground. A DC current flows through inductor 23 and energy is stored in the form of an electromagnetic field.

In a second phase of each pulse provided by control circuit 25, transistor 22 is disabled removing the path to ground for inductor 23. The stored energy in inductor 23 drives node 31 to a voltage substantially greater than the power supply voltage Vsupply (for example, 12 volts). Squib 24 comprises zener diode 33. Zener diode 33 has a predetermined breakdown voltage, for example 40 volts. The voltage at node 31 continues to rise until the breakdown voltage of zener diode 33 is reached thereby releasing energy stored in inductor 23 by providing a conductive path to ground. Zener diode 33 dissipates the power stored in inductor 23 in the form of heat. Zener diode 33 is placed in contact to pyrotechnic material. The frequency of the pulses is such that a net increase in temperature occurs in zener diode 33 after each pulse. The temperature of zener diode increases until ignition of the pyrotechnic material is achieved. Transistor 22 is designed to have a breakdown voltage that exceeds the breakdown voltage of zener diode 33.

An alternative to squib 24 is a squib 28. Squib 28 comprises a resistor 34 having a first terminal connected to node 31 and a second terminal connected to ground. Resistor 34 provides an alternate path to ground when transistor 22 is disabled. Energy stored in inductor 23 is released through resistor 34 and is dissipated as heat. A series of pulses from control circuit 25 are required to produce heat in resistor 34 sufficient to ignite pyrotechnic material.

An example illustrates values that can be used for squib ignitor circuit 20. The time required to generate heat sufficient to ignite pyrotechnic material is 200 microseconds. This assumes a value of 700 microjoules of energy to ignite pyrotechnic material. Capacitor 27 has a capacitance value of 56 microfarads for providing energy during a firing sequence. Inductor 23 has an inductance of 260 microhenries. Control circuit 25 provides pulses at a frequency of 100 kilohertz. The duty cycle of each pulse is non-symmetrical in this example with a logic one level being provided for 75 percent of a complete cycle. This corresponds to transistor 22 being enabled for 15 microseconds and disabled for 5 microseconds. A symmetrical pulse could also be used. A minimum of twenty consecutive pulses (35 microjoules per pulse) would have to provided by control circuit 25 to ignite pyrotechnic material. The breakdown voltage of squib 24 (zener diode 33) is 40 volts. The voltage Vsupply is between 9 to 12 volts. Using the parameters listed hereinabove inductor 23 would provide a peak current to squib 24 of approximately 0.5 amperes.

FIG. 3 is a schematic diagram of a squib ignitor circuit 40 in accordance with the present invention. Squib ignitor circuit 40 operates similarly to squib ignitor circuit 20 of FIG. 2. Current is pulsed through a squib 44 to ignite pyrotechnic material. Squib 44 does not generate heat when shorted to a first power supply voltage Vsupply.

Squib ignitor circuit 40 comprises a transistor 41, an inductor 43, squib 44, a resistor 48, a diode 46, and a capacitor 47. Transistors 41 and 42 have a drain, a gate, and a source, respectively corresponding to a first electrode, control electrode, and a second electrode. Transistors 41 and 42 are IGFETs but could be replaced with equivalent devices such as bipolar transistors or IGBTs.

Power is provided via a first power supply terminal connected to a power supply voltage Vsupply. Diode 46 isolates Vsupply from squib ignitor circuit 40. Diode 46 has an anode connected to the first power supply terminal and a cathode. Capacitor 47 provides power to squib ignitor circuit 40 in the event that power is unavailable during an accident. Capacitor 47 has a first terminal connected to the cathode of diode 46 and a second terminal connected to a second power supply terminal connected to a second power supply voltage (e.g. ground).

Transistor 41 couples inductor 43 to receive the power supply voltage Vsupply. Transistor 41 has a drain connected to the cathode of diode 46, a gate for receiving a control signal, and a source. Inductor 43 stores energy when a conductive path is formed between Vsupply and ground. Inductor 43 has a first terminal connected to the source of transistor 41 and a second terminal.

Squib 44 serves two functions. First, squib 44 and transistor 41 form a conductive path (Vsupply to ground) to allow current to flow through inductor 43 (to store energy). Second, squib 44 heats and ignites pyrotechnic material. Squib 44 has a first terminal connected to the second terminal of inductor 43, a control terminal, and a second terminal connected to the second power supply terminal. Squib 44 is placed in contact with pyrotechnic material.

Control circuit 45 provides a series of pulses to enable and disable squib 44 which produces heat in squib 44. Control circuit 45 has an output for providing a control signal comprising the series of pulses. A resistor 48 couples control circuit 45 to squib 44. Resistor 48 has a first terminal connected to the output of control circuit 45 and a second terminal connected to the control terminal of control circuit 45.

Squib 44 comprises a transistor 42, a zener diode 49, and a diode 50. Transistor 42 couples inductor 43 to ground. Transistor 42 has a drain connected to the first terminal of squib 44, a gate connected to the control terminal of squib 44, and a source connected to the second terminal of squib 44. Zener diode 49 has a predetermined breakdown voltage that is greater than the power supply voltage Vsupply. Zener diode 49 has an anode and a cathode connected to the first terminal of squib 44. Diode 50 blocks a conductive path through zener diode 49 when the series of pulses are applied to the gate of transistor 42. Diode 50 has an anode connected to the anode of zener diode 49 and a cathode connected to the control terminal of squib 44. Operation of squib ignitor circuit 40 is described hereinafter. The power supply voltage Vsupply is typically an automobile battery voltage (12 volts) or less. Squib ignitor circuit 40 is designed such that a short condition will not cause squib 44 to ignite pyrotechnic material. For example, enabling transistors 41 and 42 such that a steady state conductive path from Vsupply to ground is formed through inductor 43 will not produce heat in squib 44 to ignite pyrotechnic material. The on-resistance of transistor 42 is sufficiently low to minimize heat produced by transistor 42. A control signal enables transistor 41 to couple power to inductor 41. As mentioned previously, a series of pulses is provided by control circuit 45 to enable and disable transistor 42 to produce heat in squib 44. In a first phase of a pulse (one logic level), transistor 42 is enabled forming the conductive path such that current is conducted through inductor 43 to store energy. In a second phase of the pulse (zero logic level), transistor 42 is disabled. Inductor 43 tries to maintain current flow by driving the drain of transistor 42 to an ever increasing voltage. Upon reaching the breakdown voltage of zener diode 49 (for example, 40 volts), a conductive path to ground is formed through zener diode 49, diode 50, resistor 48 and control circuit 45. Resistor 48 limits the current flow through the conductive path. Transistor 42 is enabled by the voltage coupled to the gate of transistor 42 via zener diode 49. The energy of inductor 43 is rapidly dissipated by transistor 42 which produces a higher temperature than can be generated under the steady state condition when transistors 41 and 42 are enabled. The frequency and number of pulses must be sufficient to heat squib 44 to a temperature that ignites pyrotechnic material. In fact, after inductor 43 has released the energy into squib 44, the next pulse must charge inductor 43 and release energy to squib 44 such that a net increase in temperature is produced from the previous pulse. Anything less than the minimum required frequency will not produce sufficient heat in squib 44. The total number of pulses required is determined by the temperature needed to ignite pyrotechnic material. Accidental ignition of the pyrotechnic material due to shorting of squib ignitor circuit 40 is almost impossible because transistor 41 would have to be enabled with transistor 42 being intermittently enabled at the correct frequency and number of pulses.

By now it should be appreciated that a squib ignitor circuit has been provided. The squib ignitor system almost eliminates the problem of accidental deployment of an airbag. An inductor is used to store energy. The inductor releases the stored energy to a squib producing heat. The process is repeated until the squib reaches a temperature that ignites pyrotechnic material thereby deploying an airbag.

While specific embodiments of the present invention have been shown and described, further modifications and improvements will occur to those skilled in the art. It is understood that the invention is not limited to the particular forms shown and it is intended for the appended claims to cover all modifications which do not depart from the spirit and scope of this invention.

We claim:
1. A squib ignitor circuit for an airbag system comprising:
a first transistor having a first electrode coupled to a first power supply terminal for receiving a first power supply voltage, a control electrode responsive to a first control signal, and a second electrode;
an inductor having a first terminal coupled to said second electrode of said first transistor and a second terminal;

a squib having a first terminal coupled to said second terminal of said inductor and a second terminal coupled to a second power supply terminal for receiving a second power supply voltage; and a second transistor having a first electrode coupled to said second terminal of said inductor, a control electrode responsive to a second control signal, and a second electrode coupled to said second power supply terminal.

2. The squib ignitor circuit as recited in claim 1 further including a control circuit for providing said second control signal, said second control signal being a series of pulses for enabling and disabling said second transistor.

3. The squib ignitor circuit as recited in claim 2 wherein said squib comprises a zener diode having a cathode coupled to said first terminal of said squib and a second terminal coupled to said second power supply terminal.

4. The squib ignitor circuit as recited in claim 3 wherein said zener diode has a breakdown voltage greater than a voltage difference of said first and second power supply voltages.

5. The squib ignitor circuit as recited in claim 4 further including:

a diode having an anode coupled to said first power supply terminal and a cathode coupled to said first electrode of said first transistor; and a capacitor having a first terminal coupled to said first electrode of said first transistor and a second terminal coupled to said second power supply terminal.

6. The squib ignitor circuit as recited in claim 2 wherein said squib comprises a resistor having a first terminal coupled to said first terminal of said squib and a second terminal coupled to said second power supply terminal.

7. The squib ignitor circuit as recited in claim 6 wherein said resistor is a poly-silicon resistor.

8. A squib ignitor circuit for an airbag system comprising:

a first transistor having a first electrode coupled to a first power supply terminal for receiving a first power supply voltage, a control electrode responsive to a first control signal, and a second electrode;

an inductor having a first terminal coupled to said second electrode of said first transistor and a second terminal; and a squib having a first terminal coupled to said second terminal of said inductor and a second terminal coupled to a second power supply terminal for receiving a second power supply voltage;

wherein said squib comprises:

a transistor having a first electrode coupled to said first terminal of said squib, a control electrode responsive to a second control signal, and a second electrode coupled to a second power supply terminal for receiving a second power supply voltage;

a zener diode having a cathode coupled to said first electrode of said transistor and an anode; and a diode having an anode coupled to said anode of said zener diode and a cathode coupled to said control electrode of said transistor.

9. The squib ignitor circuit as recited in claim 8 further including a control circuit for providing said second control signal, said second control signal being a series of pulses for enabling and disabling said transistor.

10. The squib ignitor circuit as recited in claim 9 wherein said zener diode has a breakdown voltage greater than a voltage difference of said first and second power supply voltages.

11. A squib ignitor circuit comprising:

a first transistor having a first electrode coupled to a first power supply terminal for receiving a first power supply voltage, a control electrode responsive to a first control signal, and a second electrode;

an inductor having first terminal coupled to said second electrode of said first transistor and a second terminal;

a squib having a first terminal coupled to said second terminal of said inductor and a second terminal coupled to a second power supply terminal for receiving a second power supply voltage; and a second transistor having a first electrode coupled to said second terminal of said inductor, a control electrode responsive to a second control signal, and a second electrode coupled to said second power supply terminal wherein said second transistor is alternately enabled and disabled to respectively store energy in said inductor and to release energy to said squib for igniting a pyrotechnic material and wherein said squib does not generate sufficient heat to ignite said pyrotechnic material when said first and second power supply voltages are shorted across said squib.

12. The squib ignitor circuit as recited in claim 11 wherein said squib comprises a zener diode having a cathode coupled to said first terminal of said squib and a second terminal coupled to said second power supply terminal.

13. The squib ignitor circuit as recited in claim 12 wherein said zener diode has a breakdown voltage greater than a voltage difference of said first and second power supply voltages.

14. The squib ignitor circuit as recited in claim 11 wherein said squib comprises a resistor having a first terminal coupled to said first terminal of said squib and a second terminal coupled to said second power supply terminal.

15. The squib ignitor circuit as recited in claim 11 wherein said squib comprises:

a zener diode having a cathode coupled to said first electrode of said second transistor and an anode; and a diode having an anode coupled to said anode of said zener diode and a cathode coupled to said control electrode of said second transistor.

16. A squib ignitor circuit for an airbag system comprising:

an inductor having a first terminal coupled to a first power supply terminal for receiving a first power supply voltage and a second terminal;

a squib having a first terminal coupled to the second terminal of the inductor and a second terminal coupled to a second power supply terminal for receiving a second power supply voltage; and a control circuit electrically coupled to the squib for providing a control signal comprising a series of electrical pulses to the squib;

wherein the squib comprises:

a first transistor having a first electrode coupled to said first terminal of said squib, a control electrode responsive to the control signal, and a second electrode coupled to the second power supply terminal;

a zener diode having a cathode coupled to the first electrode of the first transistor and an anode; and a diode having an anode coupled to the anode of the zener diode and a cathode coupled to the control electrode of the first transistor;

wherein the series of pulses of the control signal enable and disable the first transistor and wherein the first transistor couples the control signal to the squib.

17. The squib igniter circuit of claim 16 further comprising:

a second transistor coupled between the first power supply terminal and the inductor, the second transistor having a first electrode coupled to the first power supply terminal for receiving the first power supply voltage, a control electrode responsive to a second control signal, and a second electrode coupled to the first terminal of the inductor.

* * * * *